(12) United States Patent
Yasukawa

(10) Patent No.: US 10,168,966 B2
(45) Date of Patent: Jan. 1, 2019

(54) INFORMATION PROCESSING APPARATUS, CONTROL METHOD FOR THE INFORMATION PROCESSING APPARATUS, AND STORAGE MEDIUM

(71) Applicant: CANON KABUSHIKI KAISHA, Tokyo (JP)

(72) Inventor: Akari Yasukawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/821,125

(22) Filed: Nov. 22, 2017

(65) Prior Publication Data

US 2018/0150269 A1     May 31, 2018

(30) Foreign Application Priority Data

Nov. 30, 2016 (JP) .................. 2016-232716

(51) Int. Cl.
*G06F 3/12* (2006.01)
*H04W 12/04* (2009.01)
*H04N 1/00* (2006.01)
*H04W 76/14* (2018.01)
(Continued)

(52) U.S. Cl.
CPC .......... *G06F 3/1236* (2013.01); *G06F 3/1203* (2013.01); *G06F 3/1222* (2013.01); *G06F 3/1238* (2013.01); *G06F 3/1286* (2013.01); *G06F 3/1292* (2013.01); *H04N 1/00411* (2013.01); *H04N 1/00477* (2013.01); *H04W 12/04* (2013.01); *H04W 76/14* (2018.02); *H04N 2201/0048* (2013.01);
(Continued)

(58) Field of Classification Search
None
See application file for complete search history.

(56) References Cited

U.S. PATENT DOCUMENTS

| 9,930,208 B2 * | 3/2018 | Kawasaki ............. H04W 76/14 |
| 2014/0240750 A1 | 8/2014 | Kawasaki |
| 2014/0320900 A1 | 10/2014 | Moriya |

(Continued)

FOREIGN PATENT DOCUMENTS

| JP | 2010-98765 A | 4/2010 |
| JP | 2013-205982 A | 10/2013 |

*Primary Examiner* — Thomas D Lee
(74) *Attorney, Agent, or Firm* — Canon U.S.A., Inc. IP Division

(57) ABSTRACT

An information processing apparatus that performs a direct wireless communication with a communication terminal includes a wireless LAN interface, a memory device that stores set of instructions, and at least one processor that executes the instructions of controlling the wireless LAN interface to activate an access point to be used in the direct wireless communication, and controlling, upon condition that the information processing apparatus operates in a first mode where an instruction for a predetermined setting change of the information processing apparatus is waited for from the communication terminal by using the direct wireless communication, transmission and reception of data via the access point by using a first communication filter, and controlling, upon condition that the information processing apparatus operates in a second mode which is different from the first mode, the transmission and the reception of the data via the access point by using a second communication filter.

13 Claims, 11 Drawing Sheets

(51) Int. Cl.
  *H04W 84/12* (2009.01)
  *H04W 48/16* (2009.01)
(52) U.S. Cl.
  CPC ..... *H04N 2201/0094* (2013.01); *H04W 48/16* (2013.01); *H04W 84/12* (2013.01)

(56) References Cited

U.S. PATENT DOCUMENTS

2015/0331650 A1    11/2015  Moritomo
2017/0055274 A1*    2/2017  Tanji .................... H04W 76/14

* cited by examiner

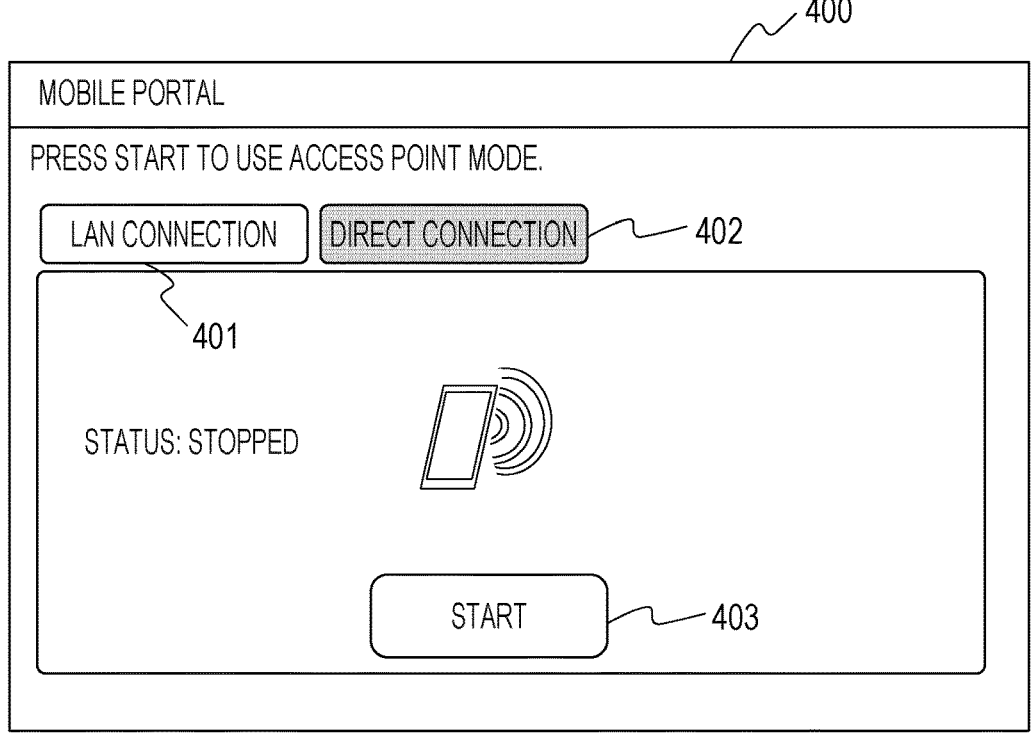
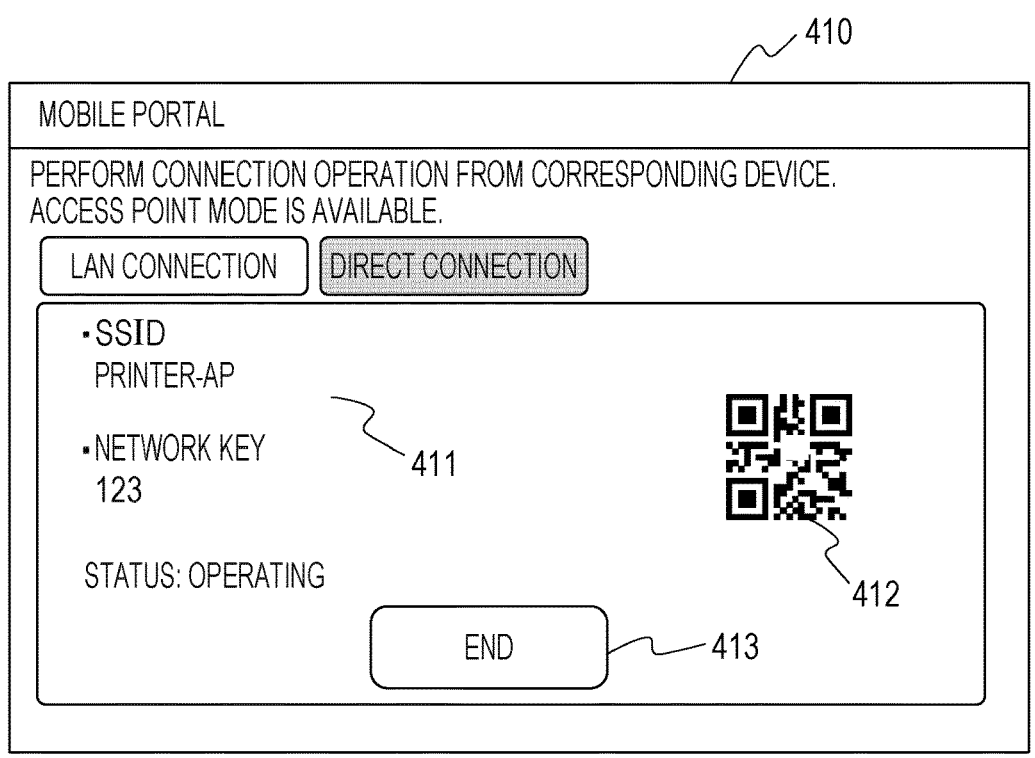

FIG. 11A

TRANSMISSION AND RECEPTION PORT SETTING IN MOBILE COOPERATION MODE

| PORT NUMBER | RECEPTION/TRANSMISSION | TCP/UDP | |
|---|---|---|---|
| 1. 9100 | RECEPTION | TCP | EDIT |
| 2. 515 | RECEPTION | TCP | EDIT |
| 3. 67 | TRANSMISSION | UDP | EDIT |
| 4. 5353 | TRANSMISSION | UDP | EDIT |
| | | | ADD |

CANCEL    OK

FIG. 11B

SETTING IN MOBILE COOPERATION MODE

| FUNCTION NAME | | |
|---|---|---|
| 1. PRINT | ON | OFF |
| 2. CONFIG | ON | OFF |
| 3. DISCOVERY | ON | OFF |

CANCEL    OK

INFORMATION PROCESSING APPARATUS, CONTROL METHOD FOR THE INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium.

Description of the Related Art

The number of information processing apparatuses such as multi function peripherals and printers including a wireless local area network (LAN) function has been increased. Among these information processing apparatuses, some apparatuses include a software AP function for the apparatus itself to operate as an access point (AP) and can perform transmission and reception of information by establishing a wireless communication with a communication terminal without the intermediation of an external relay apparatus (which will be referred to as a direct wireless communication). Japanese Patent Laid-Open No. 2013-205982 describes an information processing apparatus that establishes a wireless communication with a mobile terminal and performs transmission and reception of audio data and photograph data with a communication terminal such as the mobile terminal by using the established wireless communication.

To easily perform a setting for a wireless network of the information processing apparatus, a method of performing a network setting of the information processing apparatus via an operation unit of a communication terminal different from the information processing apparatus has been proposed (Japanese Patent Laid-Open No. 2010-98765). The communication terminal described in Japanese Patent Laid-Open No. 2010-98765 displays a list of APs discovered by a search on the operation unit of the communication terminal. A user selects an AP to which the information processing apparatus is to be connected from the list of APs displayed on the operation unit of the communication terminal. The communication terminal transmits information related to the selected AP to the information processing apparatus. The information processing apparatus can perform a setting of a network at a connection destination on the basis of the information related to the AP received from the communication terminal.

A port (permitted port) where its use is permitted in a communication to improve a security is previously set and used as a port filter of the communication in some cases in the information processing apparatus such as a printing apparatus or a personal computer (PC). In a case where a port used in the communication is not the permitted port in the above-described information processing apparatus, received data can be discarded, and the security of the information processing apparatus can be improved. In addition, an information processing apparatus such as a multi function peripheral including a mobile printing function for performing printing from the communication terminal by using the direct wireless communication has been proposed.

SUMMARY OF THE INVENTION

According to an aspect of the present invention, there is provided an information processing apparatus that performs a direct wireless communication with a communication terminal, the information processing apparatus including: a wireless local area network (LAN) interface; a memory device that stores set of instructions; and at least one processor that executes the instructions of controlling the wireless LAN interface to activate an access point to be used in the direct wireless communication, and controlling, upon condition that the information processing apparatus operates in a first mode where an instruction for a predetermined setting change of the information processing apparatus is waited for from the communication terminal by using the direct wireless communication, transmission and reception of data via the access point by using a first communication filter, and controlling, upon condition that the information processing apparatus operates in a second mode which is different from the first mode, the transmission and the reception of the data via the access point by using a second communication filter.

Further features of the present invention will become apparent from the following description of exemplary embodiments with reference to the attached drawings.

BRIEF DESCRIPTION OF THE DRAWINGS

FIGS. 4A and 4B are explanatory diagrams for describing an example of the screen displayed on the operation unit of the MFP.

FIGS. 11A and 11B are explanatory diagrams for describing an example of the screen displayed on the operation unit of the MFP.

DESCRIPTION OF THE EMBODIMENTS

According to one aspect of the present invention, there is provided a method of performing a network setting of the information processing apparatus by using a direct wireless communication from a communication terminal for an information processing apparatus such as a multi function peripheral or a printer including a mobile printing function for performing printing from the communication terminal by using the direct wireless communication.

According to another aspect of the present invention, there is provided a method of controlling communications in accordance with an intention of an administrator or the like without uniformly permitting the communications with respect to various services provided by the information processing apparatus in a case where the direct wireless communication is performed between the information processing apparatus and the communication terminal.

For example, a case will be considered where a data communication is performed from the communication terminal that establishes a wireless communication with the information processing apparatus to perform a direct wireless communication with respect to a service of mobile printing or a service of network setting of the information processing apparatus. In this case, when a general user establishes the wireless communication for the mobile printing, a method is provided in which it is possible to suppress rewrite of network setting information by using the network setting service from the communication terminal of the user while a security issue is taken into account. In addition, in a case where a network administrator or the like desires to use the network setting service by using the communication terminal, a method is provided in which it is possible to appropriately control the communication such that the network setting service can be used.

According to an aspect of the present invention, there is provided a method of performing a communication control based on different port filters in accordance with operation modes when the direct wireless communication is performed and appropriately performing a cooperation between the communication terminal and the information processing apparatus. Hereinafter, exemplary embodiments of the present invention will be described with reference to the drawings. It should be noted that the following exemplary embodiments are not intended to limit the invention related to the scope of the claims, and all of combinations of described features according to the exemplary embodiments are not necessarily essential to the solving method for the invention.

First Exemplary Embodiment

Figure 1:
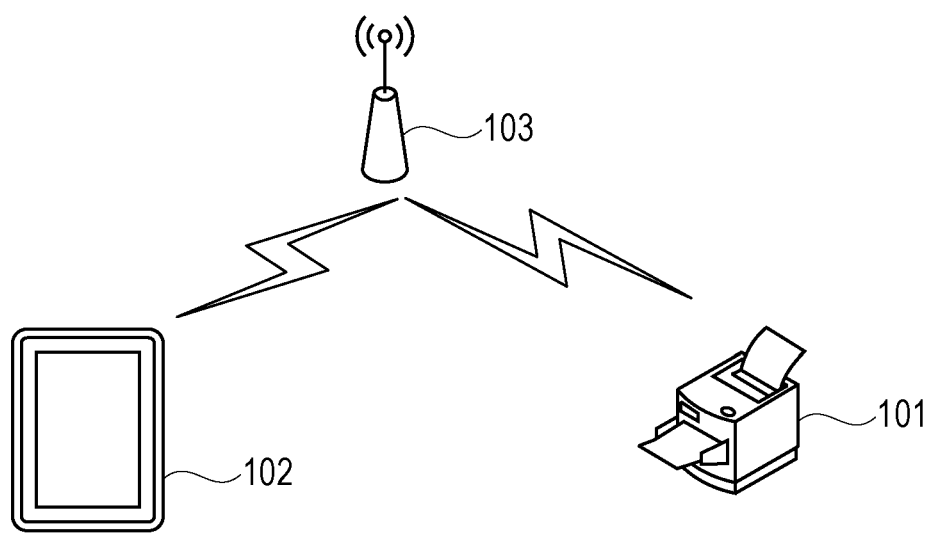
FIG. 1 illustrates an example of a printing system.

First, a configuration of a communication system according to an exemplary embodiment of the present invention will be described with reference to FIG. 1. The communication system according to the present exemplary embodiment is constituted by a multi function peripheral (MFP) 101, a communication terminal 102, and an access point (AP) 103.

The communication terminal 102 can execute a wireless communication based on IEEE 802.11 specifications (hereinafter referred to as 802.11 specifications). When the user inputs an extended service set identifier (ESSID) and a security key to the communication terminal 102 to establish a connection to the AP 103, the communication terminal 102 can be connected to a network provided by the AP 103.

The MFP 101 includes a reading function for reading an image on an original and a printing function for printing the image on a sheet. The MFP 101 also includes a mobile printing function for receiving print data via a wireless network and printing the image on a sheet.

When the ESSID and the security key for establishing the connection to the AP 103 are set as a wireless network setting of the MFP 101, the communication terminal 102 and the MFP 101 can perform a wireless communication via the AP 103.

Hereinafter, according to the present exemplary embodiment, a mode in which the communication terminal 102 and the MFP 101 perform the communication via the AP 103 will be referred to as an infrastructure wireless communication. It should be noted that the network administrator can set a mode (referred to as an infrastructure mode) in the MFP 101 on whether or not an infrastructure wireless communication is permitted according to the present exemplary embodiment. In a case where the infrastructure mode is set as ON, the MFP 101 is put into a state in which a connection can be established to an external access point (operative state in the infrastructure mode). On the other hand, in a case where the infrastructure mode is set as OFF, the MFP 101 is put into a state in which the connection to the external access point is restricted (state in which the operation in the infrastructure mode is not performed).

The communication terminal 102 communicates with the MFP 101 via the AP 103. The communication terminal 102 can transmit the print data to the MFP 101 via the AP 103. The MFP 101 that has received the print data executes printing based on the print data.

The MFP 101 activates a software AP, so that it is also possible to wirelessly communicate with the communication terminal 102 without the intermediation of a relay apparatus such as the AP 103.

In a case where the MFP 101 activates the software AP, the communication terminal 102 can be connected to the software AP provided by the MFP 101.

The user inputs connection information (such as the ESSID and the security key) for establishing the connection to the software AP activated by the MFP 101 to the communication terminal 102. The communication terminal 102 is connected to the software AP provided by the MFP 101 on the basis of the connection information input by the user. The communication terminal 102 connected to the software AP provided by the MFP 101 can execute the direct wireless communication with the MFP 101 without the intermediation of the relay apparatus such as the AP 103. Hereinafter, according to the present exemplary embodiment, a mode in which the communication terminal 102 performs the wireless communication with the MFP 101 without the intermediation of the relay apparatus such as the AP 103 will be referred to as a direct wireless communication.

The communication terminal 102 can communicate the MFP 101 with by using an infrastructure wireless communication or the direct wireless communication.

Communication Terminal

First, the communication terminal 102 will be described. The communication terminal 102 is an information processing apparatus such as, for example, a smart phone, a tablet terminal, or a personal computer (PC), and applications for various uses are installed in the communication terminal 102. According to the present exemplary embodiment, it is presumed that a setting application that provides a function for performing a network setting of a device existing in the vicinity of the communication terminal 102 is installed in the communication terminal 102. It is also presumed that a printing application for providing a printing function with which the print data can be transmitted to the MFP 101 to perform printing is installed in the communication terminal 102. The printing application transmits the print data to the MFP 101 by using the infrastructure wireless communication or the direct wireless communication, so that the MFP 101 can perform the printing.

It should be noted that the case has been exemplified where the setting application and the printing application are provided as individual applications according to the present exemplary embodiment, but the configuration is not limited to this. For example, a mode may be adopted where an operating system (OS) that controls the communication terminal 102 in an overall manner provides the printing function and the setting function described above as basic functions of the OS.

Information Processing Apparatus

Figure 2:
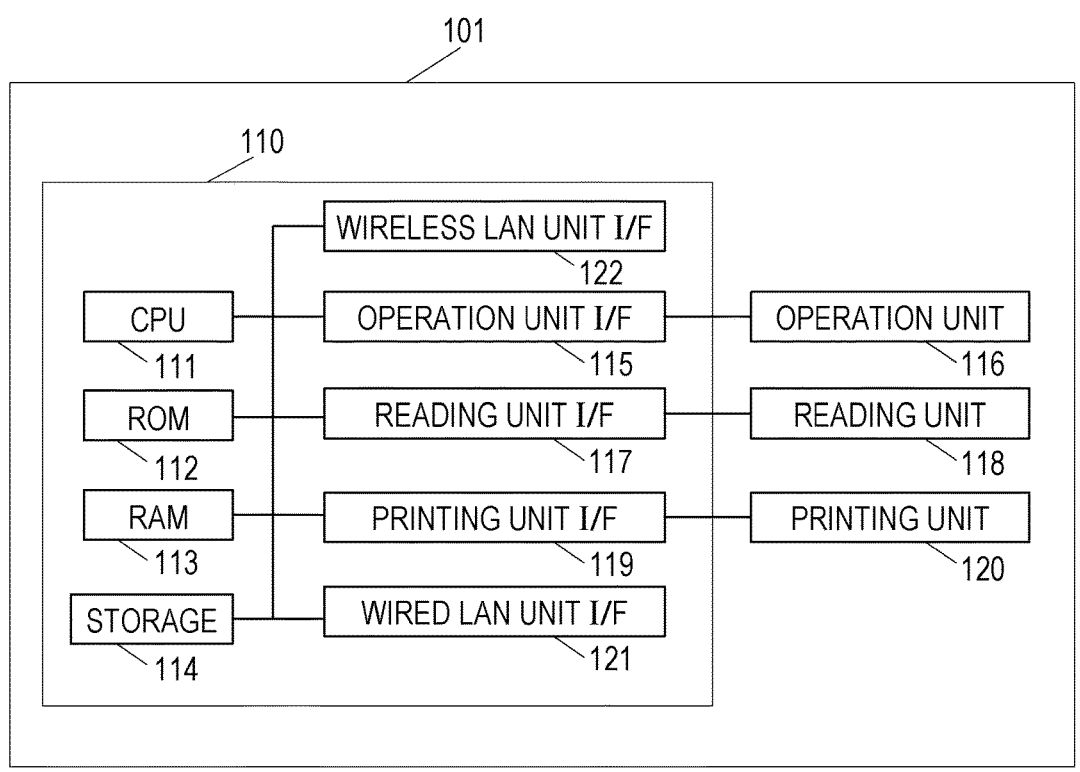
FIG. 2 illustrates an example of a hardware configuration of a multi function peripheral (MFP).

Next, the MFP 101 will be described. FIG. 2 is a block diagram illustrating a hardware configuration of the MFP 101.

The control unit 110 including a central processing unit (CPU) 111 controls an operation of the entirety of the MFP 101. The CPU 111 reads out control programs stored in a read only memory (ROM) 112 or a storage 114 and performs various controls such as printing control and reading control. The ROM 112 stores the control programs that can be executed by the CPU 111. A random access memory (RAM) 113 is a main storage memory of the CPU 111 and used as a work area or a temporary storage area for developing commands of the various control programs. The storage 114 stores print data, image data, various programs, and various setting information.

It should be noted that the single CPU 111 executes respective processings illustrated in flow charts which will be described below by using the single memory (RAM 113) in the MFP 101 according to the present exemplary embodiment, but another mode may also be adopted. For example, the respective processings illustrated in flow charts which will be described below can be executed by a plurality of CPUs, RAMs, ROMs, and storages in cooperation with one another. Part of the processings may also be executed by using a hardware circuit such as an application specific integrated circuit (ASIC) or a field-programmable gate array (FPGA).

An operation unit interface (I/F) 115 connects an operation unit 116 to a control unit 110. The operation unit 116 is provided with a liquid crystal display unit including a touch panel function, various hard keys, and the like and functions as a display unit that displays information and an acceptance unit that accepts an instruction from the user.

A reading unit I/F 117 connects a reading unit 118 to the control unit 110. The reading unit 118 reads the original and generates a read image. The generated read image is transmitted to an outside via a network or used for printing.

A printing unit I/F 119 connects a printing unit 120 to the control unit 110. The printing unit 120 prints an image on a sheet on the basis of the print data received from the outside or the read image.

The control unit 110 is connected to a network which is not illustrated in the drawing via a wired LAN I/F 121. The wired LAN I/F 121 transmits an image or information to an external apparatus on the network which is not illustrated in the drawing and receives the print data or the information from the external apparatus on the network.

Furthermore, the control unit 110 is provided with a wireless LAN I/F 122. The wireless LAN I/F 122 provides a function of a wireless client for performing a wireless communication by establishing a connection to the external AP and the function of the software AP for the MFP 101 to act as the AP.

The function of the wireless client of the MFP 101 is operated in a case where the infrastructure mode is ON. A connection to an external access point is established on the basis of the wireless network setting stored in the MFP 101 in a case where the infrastructure mode is ON. For example, when the ESSID and the security key for establishing the connection to the AP 103 are set as the wireless network setting, the MFP 101 can perform the wireless communication via the AP 103 with another apparatus connected to the AP 103.

The software AP is activated in a case where an access point mode is ON. In a case where the user sets the access point mode as ON, the wireless LAN I/F 122 activates the software AP and operates as the AP to which the external apparatus can be connected. The ESSID and the security key for establishing the connection to the software AP are displayed on the operation unit 116 of the MFP 101 in accordance with a user operation. According to the present exemplary embodiment, the wireless LAN I/F 122 according to the present exemplary embodiment can activate the single software AP, but a plurality of software APs are not activated at the time same.

Therefore, the physical network interfaces included in the MFP 101 are two network interfaces including the wired LAN I/F 121 and the wireless LAN I/F 122, but the MFP 101 logically includes three network interfaces.

To distinguish these network interfaces from one another, the network interface where the data is transmitted and received via the wired LAN I/F 121 will be referred to as "eth0". The network interface where the data is transmitted and received with the external AP in the infrastructure mode will be referred to as "wlan0". The network interface where the data is transmitted and received via the software AP will be referred to as "wlan1".

It should be noted that the wireless LAN I/F 122 according to the present exemplary embodiment can operate the function of the wireless client and the function of the software AP at the same time, but the configuration is not limited to this. For example, in a case where the wireless LAN I/F 122 can operate only one of the function of the wireless client and the function of the software AP, the wireless LAN I/F 122 may perform exclusive processing to select and operate one of the modes. In this case, for example, when the infrastructure mode is set as ON to perform the infrastructure wireless communication, the access point mode may be set as OFF to stop the operation of the software AP. When the access point mode is set as ON to activate the software AP, the infrastructure mode may be set as OFF to restrict the connection to the external access point.

In addition, according to the present exemplary embodiment, the MFP 101 is exemplified as an example of the information processing apparatus in cooperation with the communication terminal 102, but the configuration is not limited to this. The exemplary embodiment can also be applied to various devices that can start the software AP to perform a cooperation with the other apparatus. For example, the configuration can also be applied to a single function peripheral (SFP) such as a scanner apparatus and a printer apparatus and a device such as a digital camera and a digital signage apparatus.

Cooperation with the Communication Terminal by Using the Software AP

Next, a function of performing a cooperation with the communication terminal 102 by using the software AP according to the present exemplary embodiment will be described.

The MFP 101 uses the software AP for a plurality of uses. First, when the mobile printing function (service) is provided to the user of the MFP 101, the software AP is used as a first use. For example, in a case where printing is desired to be performed from a communication terminal of an office visitor, a privately owned communication terminal, or the like, use of an infrastructure environment installed in a company is not permitted in many cases from the viewpoint of security. In view of the above, the MFP 101 according to the present exemplary embodiment establishes the wireless communication between the software AP activated by the MFP 101 and the communication terminal 102 and provides the mobile printing function for receiving the print data by the direct wireless communication to perform the printing.

To use the network setting function provided to the network administrator of the MFP 101 or the like, the software AP is used as a second use.

As described above, the network administrator can perform the setting of the wireless network of the MFP 101 by using the setting application of the communication terminal 102. At this time, the setting application of the communication terminal 102 establishes the wireless communication with the software AP of the MFP 101 and transmits setting data of the wireless network by the direct wireless communication. The MFP 101 performs processing based on the setting data received from the communication terminal 102 by the service for cooperating with the setting application. Specifically, the ESSID and the security key included in the received data are stored as the wireless network setting. The service for cooperating with the setting application reflects the wireless network setting and connects the MFP 101 to the AP outside the apparatus.

At this time, in a case where the direct wireless communication via the software AP of the MFP 101 is performed between the MFP 101 and the communication terminal 102, an issue occurs from the viewpoint of security if communications with respect to various services of the MFP 101 are uniformly permitted.

For example, when a general user establishes the wireless communication for the mobile printing and performs the direct wireless communication, the security issue occurs if the network setting information can be rewritten by using the network setting service from the communication terminal of the user.

On the other hand, when the direct wireless communication is performed by using the software AP, if communications other than the communications used in the mobile printing service are uniformly prohibited, the communications with respect to the above-described network setting service are restricted, and there is a risk that the setting is not performed. Therefore, in a case where the network administrator or the like desires to use the network setting service by using the communication terminal, there is a risk that the network setting service is not used.

In view of the above, according to the present exemplary embodiment, operation modes for performing the direct wireless communication are varied when the function designed for the general user such as the mobile printing function is provided and when the network setting function designed for the network administrator is provided. Furthermore, different port filters are applied to the network interface where the transmission and the reception of the data are performed via the software AP in accordance with the operation modes, and the cooperation between the communication terminal 102 and the MFP 101 can be appropriately performed. Hereinafter, a method of realizing these controls will be described.

Activation of the Software AP

First, a method for the user of the MFP 101 to activate the software AP of the MFP 101 will be described.

It should be noted that, according to the present exemplary embodiment, a case where the function such as the mobile printing function designed for the general user is used will be referred to as a mobile cooperation mode, and a case where the network setting function designed for the network administrator is used will be referred to as a wireless LAN setting mode.

A method for the user to activate the software AP for the mobile cooperation mode will be described with reference to FIG. 3 and FIGS. 4A and 4B.

Figure 3:
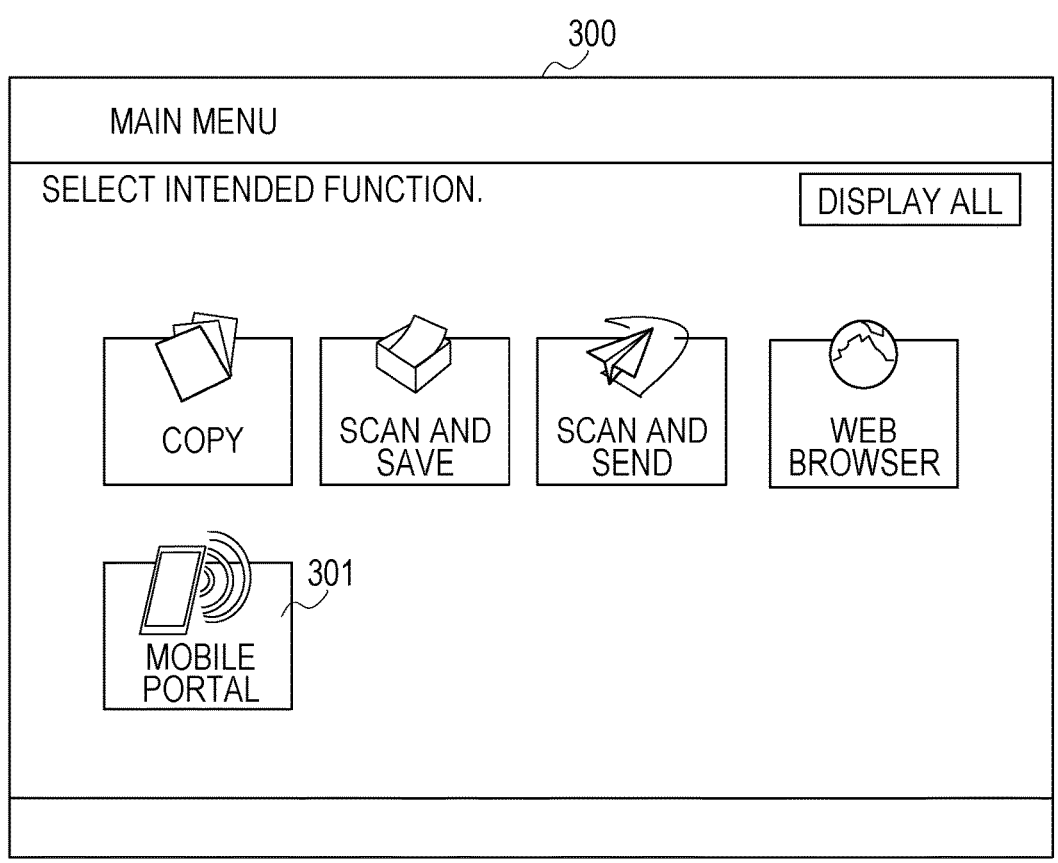
FIG. 3 is an explanatory diagram for describing an example of a screen displayed on an operation unit of the MFP.

FIG. 3 illustrates an example of a screen displayed on the operation unit 116 of the MFP 101. In FIG. 3, a main menu screen 300 for the user of the MFP 101 to select the respective functions of the MFP 101 is illustrated as an example. The user selects a key (displayed item) for using a copy function or a scanning function of the MFP 101 from the main menu screen 300, so that it is possible to use the respective functions of the MFP.

A mobile portal key 301 is a key used in a case where a cooperation with the communication terminal 102 such as the smart phone or the tablet terminal is performed. When the user selects the mobile portal key 301, it is possible to shift the screen displayed on the operation unit 116 to a mobile portal screen.

FIGS. 4A and 4B illustrates examples of the screen displayed on the operation unit 116 of the MFP 101. In FIGS. 4A and 4B, the mobile portal screen is illustrated as an example.

The user can check information used when the communication terminal 102 and the MFP 101 are connected to each other and change a connection method to the communication terminal 102 via mobile portal screens 400 and 410.

A LAN connection key 401 is a key used in a case where the MFP 101 and the communication terminal 102 are connected to the same network (for example, the AP 103). When the LAN connection key 401 is pressed, a connection support screen (not illustrated in the drawing) is displayed. A QR code (registered trademark) including an IP address of the apparatus or the like is displayed on the connection support screen. The printing application of the communication terminal reads the QR code displayed on the operation unit 116 and obtains the IP address corresponding to an address where the print data is transmitted to the MFP 101. In addition, the print data is transmitted to the MFP 101 by using the obtained address.

A direct connection key 402 is a key used in a case where the connection for the direct wireless communication is established between the MFP 101 and the communication terminal 102 to perform the mobile printing function. It should be noted that FIGS. 4A and 4B illustrate a screen in a case where the direct connection key 402 is selected as an example.

A start key 403 is a key used in a case where the software AP to be used in the direct wireless communication is activated. The CPU 111 switches the screen displayed on the operation unit 116 to the mobile portal screen 410 exemplified in FIG. 4B on the basis of the selection of the start key 403 by the user.

The CPU 111 also sets the access point mode as ON and controls the wireless LAN I/F 122 to activate the software AP for the mobile cooperation mode.

Herein, a case is exemplified where the software AP is activated by using a setting that the ESSID for identifying the access point is "PRINTER-AP" and the network key is "123" when the software AP for the mobile cooperation mode is activated. It should be noted that, according to the present exemplary embodiment, the setting of the ESSID and the network key of the software AP to be activated is previously stored in the storage 114 of the MFP 101, but the configuration is not limited to this. For example, the ESSID can be generated from a name or a model of the MFP 101 or the like or generated by using information such as a date or a time. In addition, the network key may be generated at random when the software AP is activated. A configuration can also be adopted where the user or the network administrator can change the setting of the ESSID and the network key when the software AP for the mobile cooperation mode is activated.

Information 411 is displayed on the mobile portal screen 410 as the connection information for establishing the connection to the software AP of the MFP 101. In addition, the QR code 412 including the connection information such as the ESSID and the network key is displayed on the mobile portal screen 410. An end key 413 is a key used when the software AP for the mobile cooperation mode is stopped. The MFP 101 stops the operating software AP for the mobile cooperation mode on the basis of the selection of the end key 413 by the user.

The printing application of the communication terminal 102 asks the user to read the QR code by using a camera (not illustrated in the drawing) of the communication terminal 102, and it is possible to obtain the connection information for establishing the connection to the software AP of the MFP 101. The printing application of the communication terminal 102 also asks the user to input the ESSID and the network key, and it is possible to obtain the connection information. The user can figure out the ESSID and the network key that are to be input to the printing application by looking at the information 411 displayed on the mobile portal screen 410.

The CPU 111 also applies the port filter for performing communication access control to "wlan1" corresponding to the network interface where the data is transmitted and received via the software AP. This port filter is a filter in which the communication for using the function designed for the general user such as the mobile printing function is permitted and the data reception is rejected (reception data is discarded) in the other communications. A specific example of the port filter will be described with reference to a flow chart which will be described below.

As a result of this processing, the communication for using the function designed for the general user such as the mobile printing function can be permitted in a state in which the MFP 101 activates the software AP for the mobile cooperation mode. In addition, as a result of this processing, it is possible to discard the other communication (for example, the reception of the setting data transmitted from the above-described setting application) in a state in which the MFP 101 activates the software AP for the mobile cooperation mode.

Next, a method for the user to activate the software AP for the wireless LAN setting mode will be described with reference to FIGS. 5A and 5B.

Figure 5A:
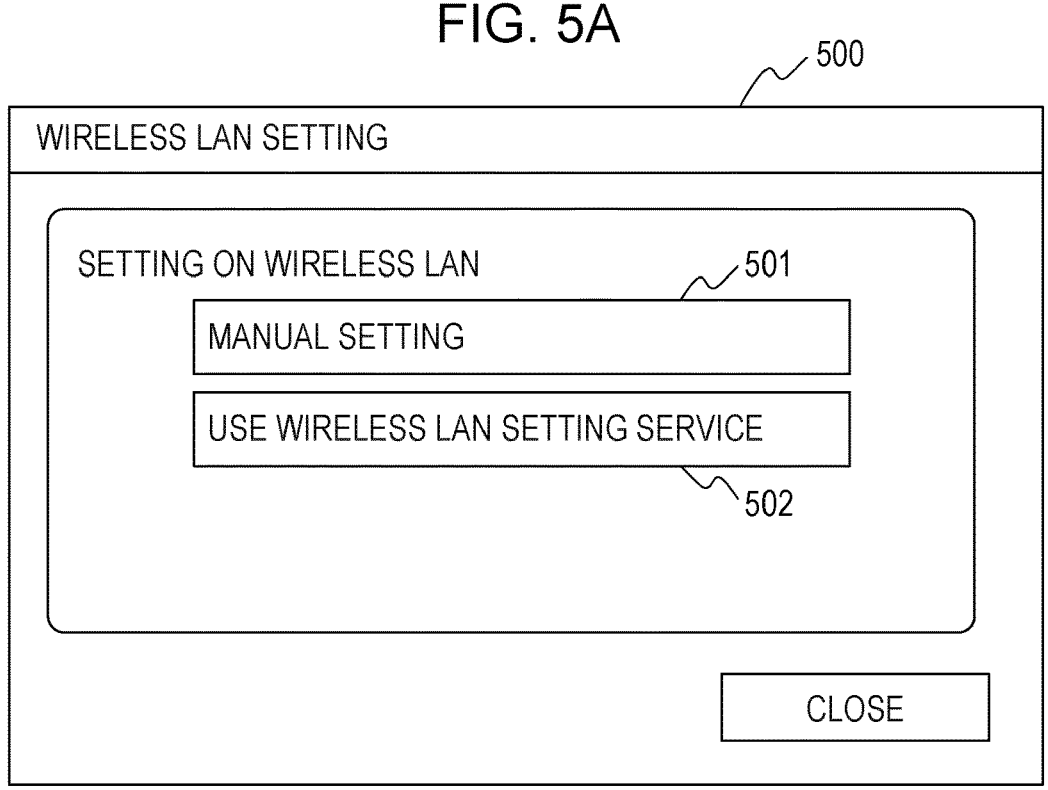
FIGS. 5A and 5B are explanatory diagrams for describing an example of the screen displayed on the operation unit of the MFP.
Figure 5B:
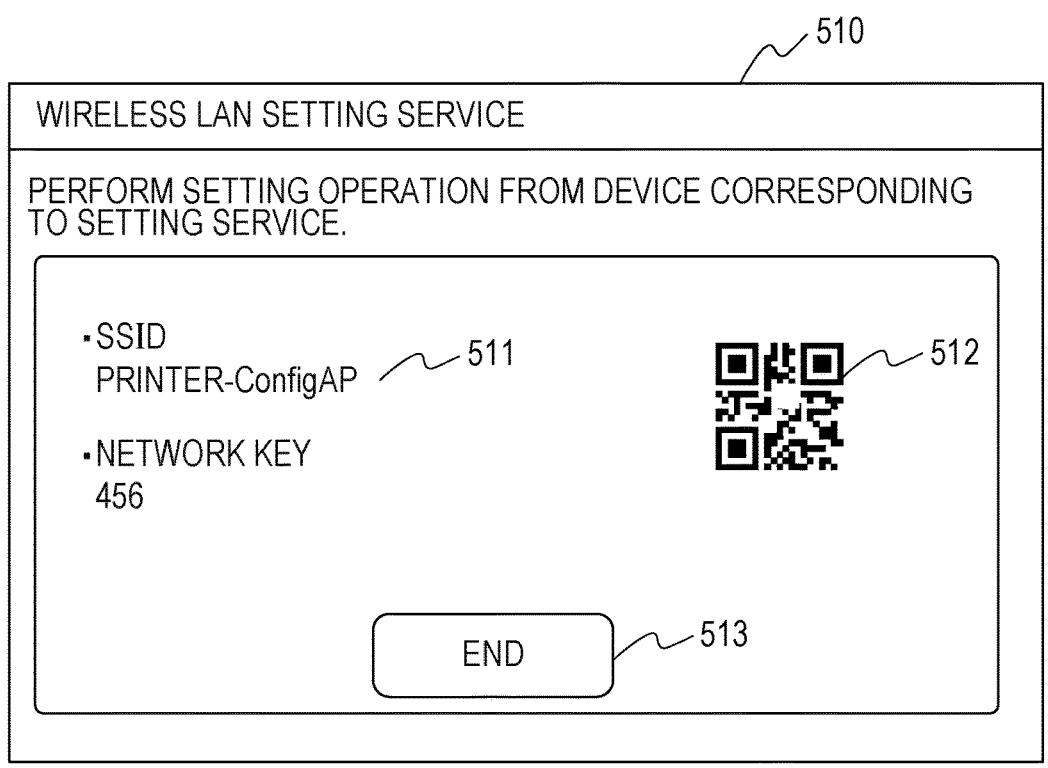

FIGS. 5A and 5B illustrate a setting screen 500 for the wireless LAN as an example of a screen displayed on the operation unit 116 of the MFP 101. When the selection of the item of the network setting by the administrator of the MFP 101 is accepted from a setting screen (not illustrated in the drawing) for setting an operation of the MFP, the MFP 101 displays the setting screen 500 for the wireless LAN on the operation unit 116. It should be noted that, according to the present exemplary embodiment, a setting is performed such that only a user (for example, a device administrator) who has an authority of network management can perform the setting based on the setting screen 500 to suppress an unexpected change of the network setting of the MFP 101. For example, the MFP 101 performs user authentication before the setting screen 500 is displayed, and the setting screen 500 is displayed only in a case where this authentication succeeds.

A setting with respect to the wireless LAN I/F 122 can be performed on the setting screen 500. A "manual setting" key 501 is a key used in a case where a setting with regard to the external AP to which the MFP 101 is connected is manually performed. When the "manual setting" key 501 is selected, the user can perform the wireless network setting of the MFP 101 from an input screen (not illustrated in the drawing). In this case, the user inputs the ESSID of the AP that is to be connected by the MFP 101 and the security key from the input screen to perform the manual wireless network setting.

A "use wireless LAN setting service" key 502 is a key used in a case where the setting with respect to the wireless LAN I/F 122 is performed in cooperation with the setting application of the communication terminal 102.

When it is determined that the "use wireless LAN setting service" key 502 is selected, the CPU 111 sets the access point mode as ON and activates the software AP for the wireless LAN setting mode. The CPU 111 also switches the screen displayed on the operation unit 116 to a screen 510 exemplified in FIG. 5B on the basis of the selection of the start key 403 by the user.

Herein, a case is exemplified where the software AP is activated while the ESSID is set as "PRINTER-ConfigAP" and the network key is set as "456" when the software AP for the wireless LAN setting mode is activated. It should be noted that the setting of the ESSID of the software AP to be activated or the network key is previously stored in the storage 114 of the MFP 101 according to the present exemplary embodiment, but the configuration is not limited to this. For example, the ESSID can be generated from a name or a model of the MFP 101 or the like or generated by information such as a date or a time. In addition, the network key may be generated at random when the software AP is activated. A configuration can also be adopted where the user or the network administrator can change the setting of the ESSID and the network key when the software AP for the mobile cooperation mode is activated.

Information 511 is displayed on the screen 510 as the connection information for establishing the connection to the software AP for the wireless LAN setting mode of the MFP 101. A QR code 512 including the connection information such as the ESSID and the network key is also displayed on the screen 510. An end key 513 is a key used in a case where the software AP for the wireless LAN setting mode is stopped. When it is detected that the user selects the end key 513, the MFP 101 stops the operating software AP for the wireless LAN setting mode.

When the setting application of the communication terminal 102 asks the user to read the QR code by using the camera (not illustrated in the drawing) of the communication terminal 102, it is possible to obtain the connection information for establishing the connection to the software AP for the wireless LAN setting mode of the MFP 101. In addition, when the setting application of the communication terminal 102 asks the user to input the ESSID and the network key, it is possible to obtain the connection information. The user can figure out the ESSID and the network key that are to be input to the printing application by looking at the information 511 displayed on the screen 510.

The CPU 111 applies a port filter for performing the communication access control to "wlan1" where the data is transmitted and received via the software AP. This port filter is a filter in which the communication used in the cooperation with the setting application is permitted, and the received data is discarded in the other communication. A specific example of the port filter will be described with reference to a flow chart which will be described below.

Next, control related to the cooperation between the MFP 101 and the communication terminal 102 will be described with reference to flow charts of FIG. 6 to FIG. 8. Respective operations (steps) illustrated in the flow charts of FIG. 6 to FIG. 8 are realized when the CPU 111 reads out programs for realizing respective control modules which are stored in the ROM 112 or the storage 114 onto the RAM 113 to be executed.

Figure 6:
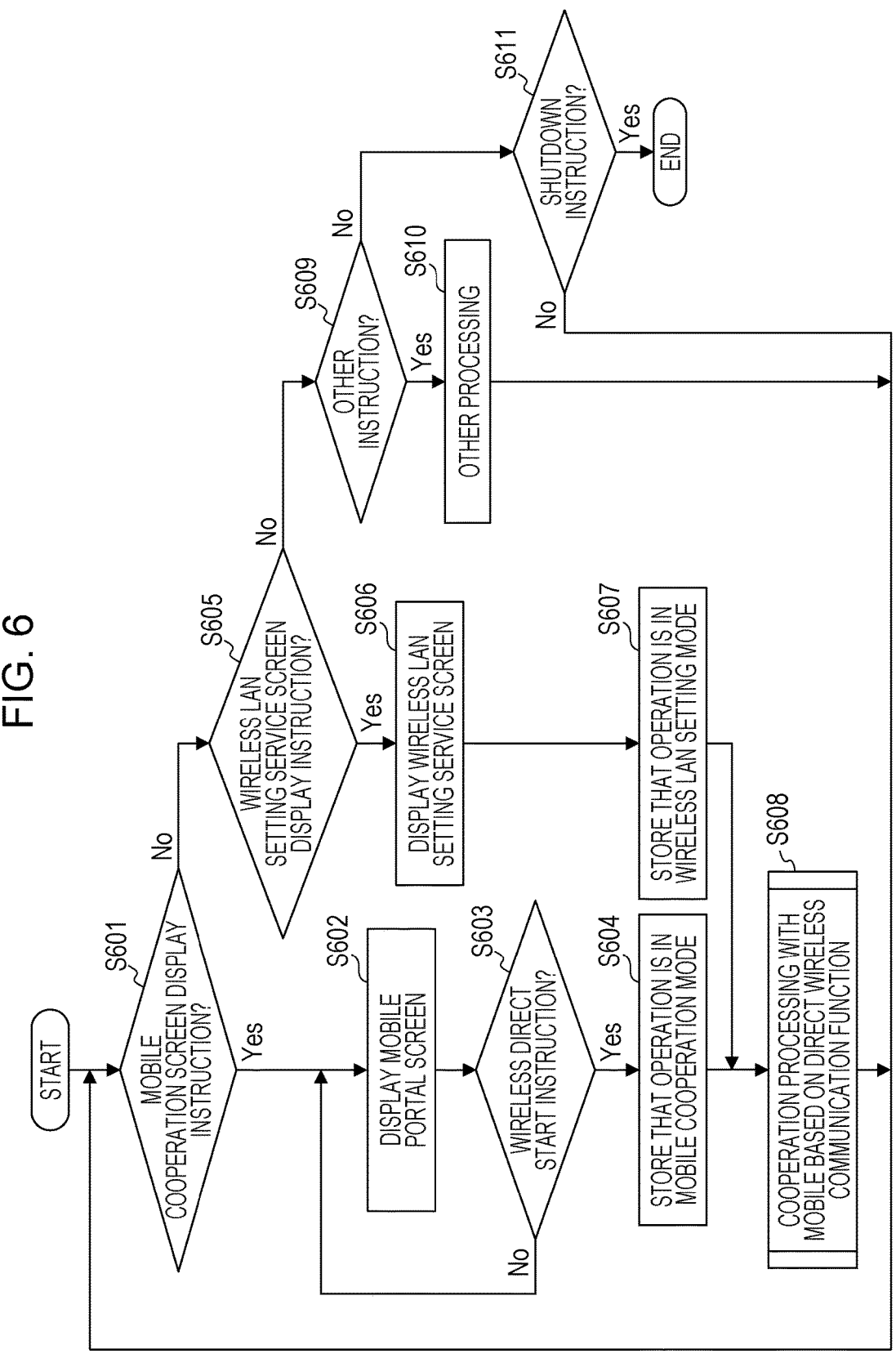
FIG. 6 is an example of a flow chart illustrating control of the MFP.
Figure 7:
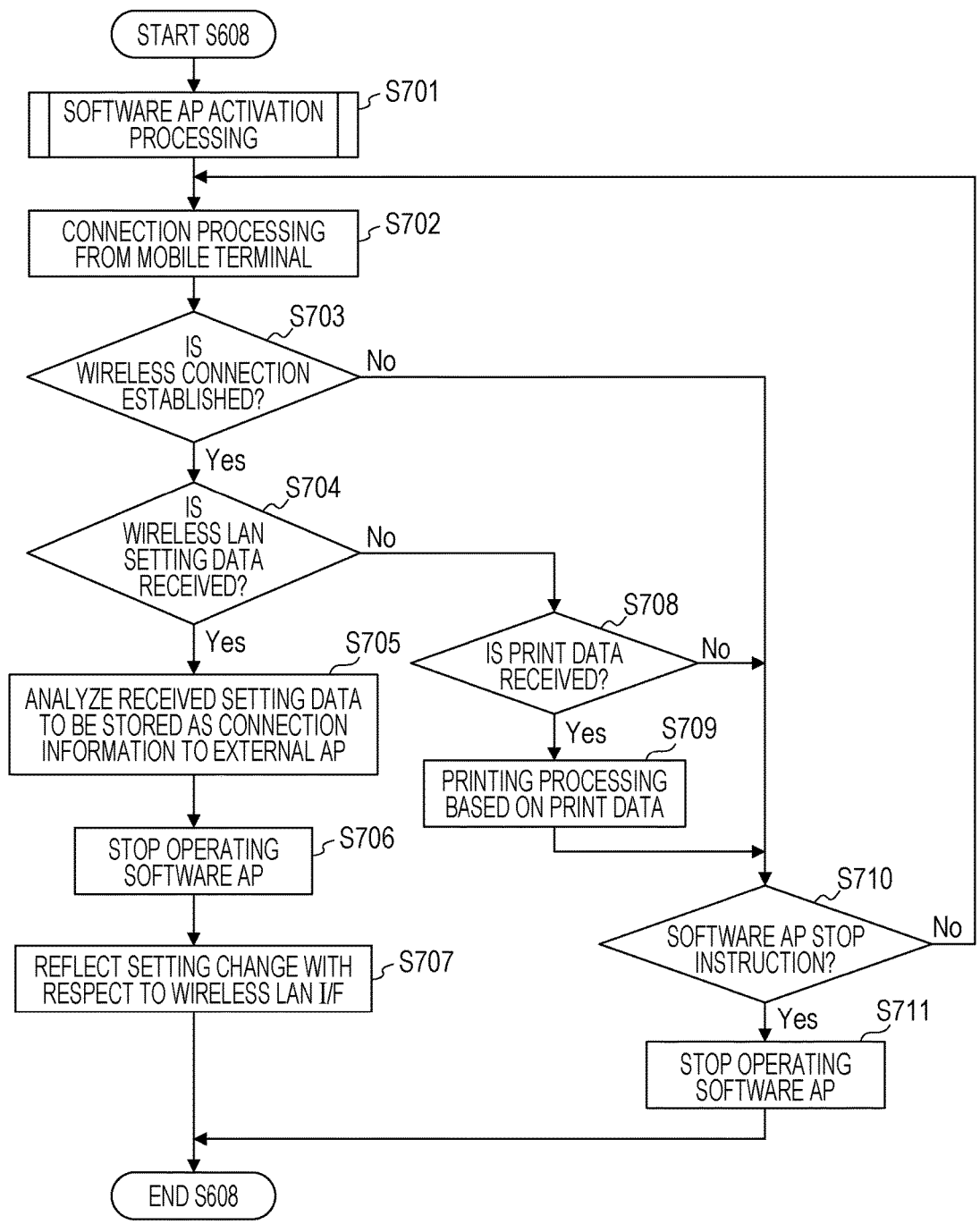
FIG. 7 is an example of a flow chart illustrating control related to a mobile cooperation of the MFP.
Figure 8:
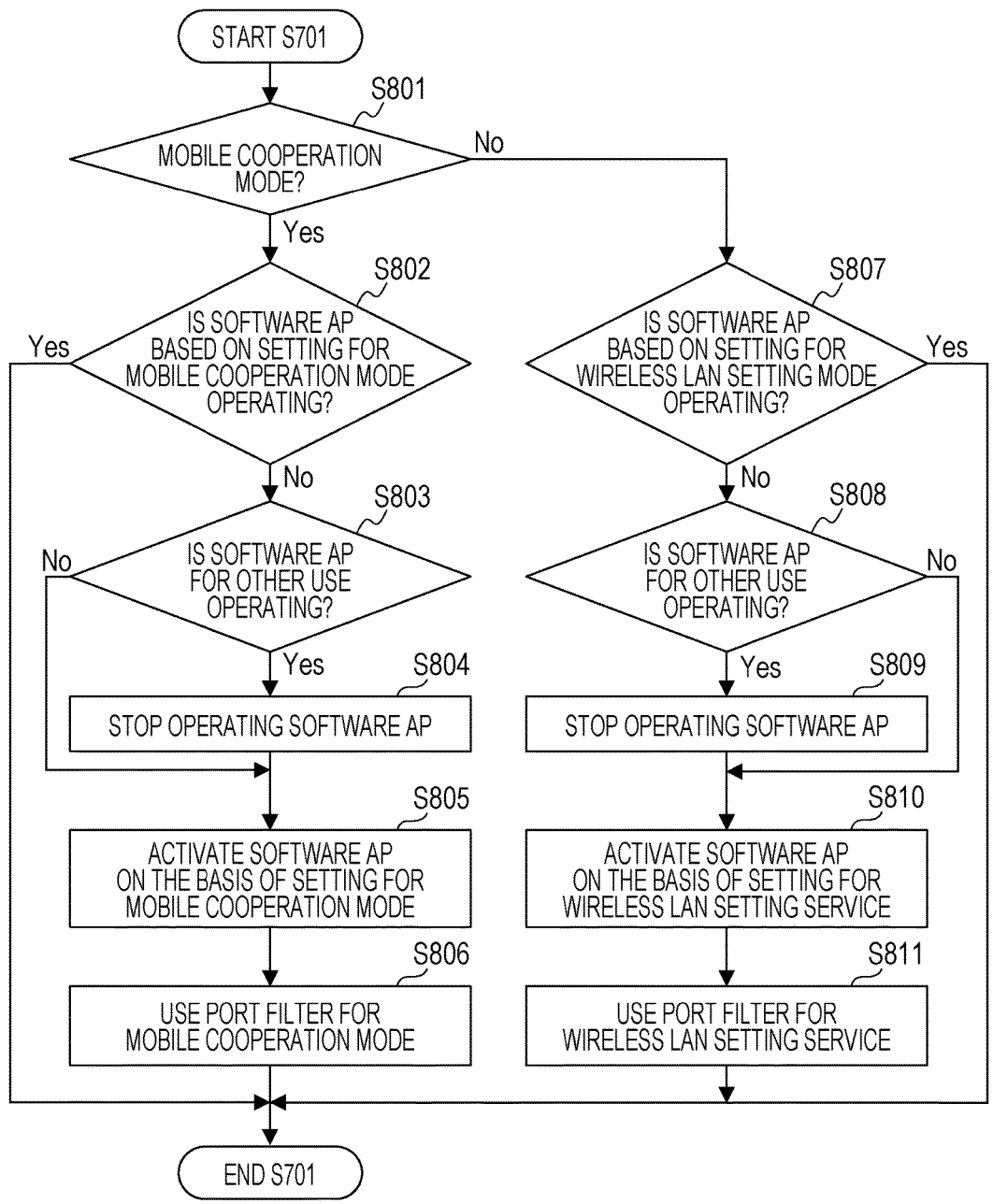
FIG. 8 is an example of a flow chart illustrating control related to an access point (AP) of the MFP.

The CPU 111 executes the flow charts of FIG. 6 to FIG. 8 in a case where the MFP 101 operates in a normal mode while a power source is ON. When the MFP 101 is supplied with power and the MFP 101 can be used by various boot programs, the CPU 111 executes the control illustrated in the flow chart illustrated in FIG. 6.

In S601, the CPU 111 determines whether or not a display instruction of the mobile portal screen is accepted. In a case where the mobile portal key 301 is selected via the main menu screen 300, the CPU 111 determines that the display instruction of the mobile portal screen is accepted, and the processing proceeds to S602. In a case where the mobile portal key 301 is not selected via the main menu screen 300, it is determined that the display instruction of the mobile portal screen is not accepted, and the processing proceeds to S605.

In S602, the CPU 111 displays the mobile portal screen on the operation unit 116, and the processing proceeds to S603. In S603, the CPU 111 determines whether or not an instruction for starting the wireless direct is accepted via the mobile portal screen 400. In a case where the instruction for starting the wireless direct is accepted, the processing proceeds to S604. In a case where the instruction for starting the wireless direct is not accepted, the processing returns to S602, and the start instruction by the user is waited for. It should be noted that the CPU 111 returns to the processing in S601 in a case where the user operation for shifting to a main menu or the like is accepted in a state in which the mobile portal screen is displayed.

In S604, the CPU 111 stores a flag indicating that the operation is performed in the mobile cooperation mode in the RAM 113, and the processing proceeds to S608. The flag stored in the RAM 113 will be appropriately referred to in a step which will be described below.

In S608, the cooperation processing with the communication terminal 102 using the direct wireless communication is performed. Specific contents thereof will be described below.

On the other hand, in S605, the CPU 111 determines whether or not an instruction for displaying the screen 510 for the wireless LAN setting service is accepted. In a case where the "use wireless LAN setting service" key 502 is selected via the setting screen 500, the CPU 111 determines that the instruction for displaying the screen 510 for the wireless LAN setting service is accepted, and the processing proceeds to S606. On the other hand, in a case where the "use wireless LAN setting service" key 502 is not selected, the processing proceeds to S609.

In S606, the CPU 111 displays the screen 510 for the wireless LAN setting service on the operation unit 116, and the processing proceeds to S607. In S607, the CPU 111 stores a flag indicating that the operation is performed in the wireless LAN setting mode in the RAM 113, and the processing proceeds to S608. The flag stored in the RAM 113 will be appropriately referred to in a step which will be described below.

On the other hand, in S609, the CPU 111 determines whether or not the other instruction is accepted. In a case where the other instruction is accepted, the processing proceeds to S610. In a case where the other instruction is not accepted, the processing proceeds to S611.

In S610, the CPU 111 performs processing based on the other instruction accepted in S609. For example, the CPU 111 performs copying processing of printing the image obtained by reading the original by the reading unit 118 on a sheet on the basis of the user instruction or "scan and send" processing of reading the original by the reading unit 118 to be sent to the outside. In a case where the print data is received from the external apparatus via the AP 103 or the wired LAN I/F 121, printing processing based on the received print data is performed. When the processing based on the instruction, the CPU 111 returns to the processing in S601.

In S611, the CPU 111 determines whether or not an instruction for shutting down the MFP 101 is accepted. In a case where the instruction for shutting down the MFP 101 is accepted, shutdown processing of turning off the power supply to the MFP 101 is executed to end the series of processings. On the other hand, in a case where the instruction for shutting down the MFP 101 is not accepted, the processing returns to S601.

Next, the cooperation processing with the communication terminal 102 using the direct wireless communication in S605 will be described with reference to the flow charts of FIG. 7.

In S701, the CPU 111 performs activation processing for the software AP. The activation processing for the software AP will be described with reference to the flow chart of FIG. 8.

In S801, the CPU 111 determines whether or not the operation is performed in the mobile cooperation mode. In a case where the flag indicating that the operation is performed in the mobile cooperation mode is stored in the RAM 113, the processing proceeds to S802. In a case where the flag indicating that the operation is performed in the mobile cooperation mode is not stored in the RAM 113 (that is, a case where the flag indicating that the operation is performed in the wireless LAN setting mode is stored), the processing proceeds to S807.

In S802, the CPU 111 determines whether or not the software AP based on the setting for the mobile cooperation mode is operating in cooperation with the wireless LAN I/F 122. When the software AP based on the setting for the mobile cooperation mode is operating, the processing proceeds to S702 in FIG. 7 (skipping the processings in S803 to S806). When the software AP based on the setting for the mobile cooperation mode is not operating, the processing proceeds to S803.

In S803, the CPU 111 determines whether or not the software AP for the other use is operating in cooperation with the wireless LAN I/F 122. When the software AP for the other use is operating, the processing proceeds to S804. When the software AP for the other use is not is operating, the processing proceeds to S805.

In S804, the CPU 111 stops the operating software AP in cooperation with the wireless LAN I/F 122, and the processing proceeds to S805. In S805, the CPU 111 activates the software AP on the basis of a setting for the mobile cooperation. For example, the CPU 111 activates the software AP in which the ESSID is set as "PRINTER-AP" and the network key is set as "123".

In S806, the CPU 111 applies a port filter for the mobile cooperation to "wlan1" where the data is transmitted and received via the software AP.

Figure 9A:
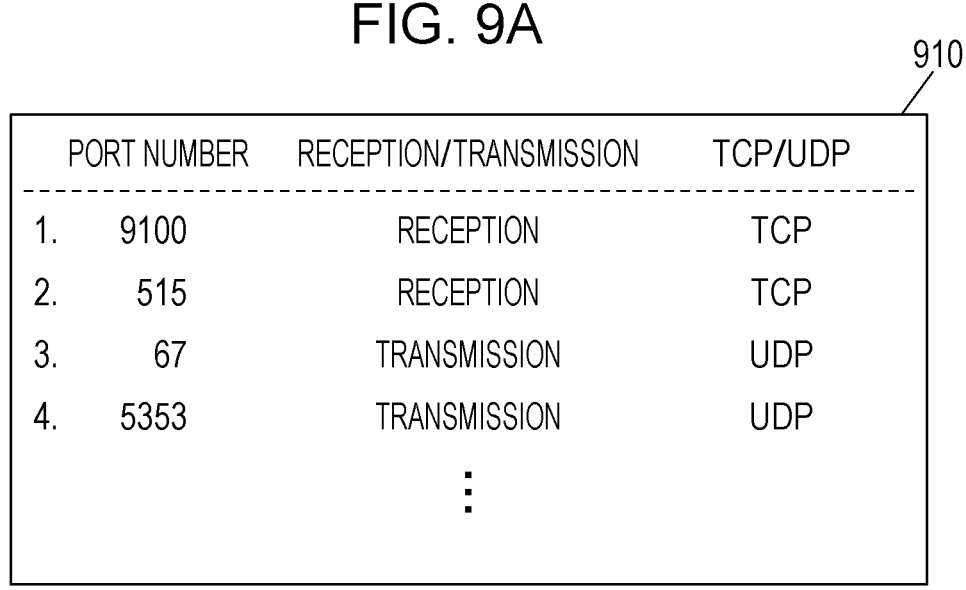
FIGS. 9A and 9B illustrate an example of a port filter stored in a storage.
Figure 9B:
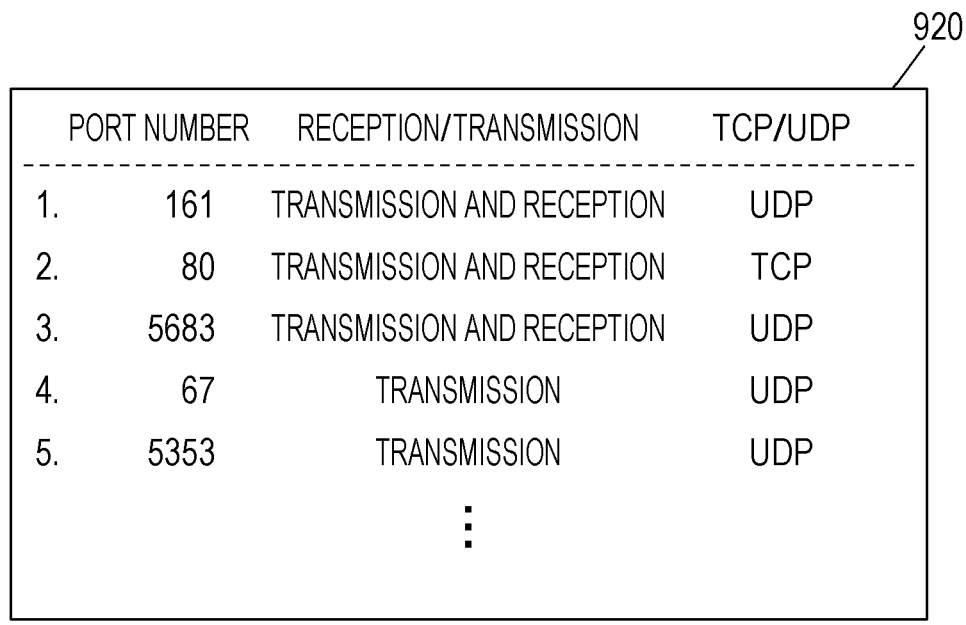

FIGS. 9A and 9B are explanatory diagrams for describing the port filter applied to "wlan1" where the data is transmitted and received via the software AP. FIG. 9A is an explanatory diagram for describing a port filter 910 used when the software AP for the mobile cooperation is activated. The port filter is used for controlling communications in a transmission port and a reception port.

Ports 9100 and 515 are ports used for the MFP 101 to receive the print data and used for waiting for the print data in RAW printing or line printer remote (LPR) printing. Herein, since the data needs to be waited for in Ports 9100 and 515 to receive the print data from the printing application of the communication terminal 102, data reception in the ports is permitted.

Port 67 is a port used by a Dynamic Host Configuration Protocol (DHCP) service. Port 5353 is a port used for responding to an apparatus search request transmitted from the communication terminal 102 or the like. Since the above-described ports need to transmit the data at the time of the cooperation with the printing application, data transmission in the ports is permitted.

In this manner, a rule is defined in which the port filter in a case where the operation is performed in the mobile cooperation mode releases only the ports where the communication occurs at the time of the cooperation with the printing application and closes the other ports. The CPU 111 applies the port filter to "wlan1" where the data is transmitted and received via the software AP. It should be noted that, in a case where the printing application includes other cooperation functions, port filtering corresponding to the other cooperation functions is appropriately performed. In addition, according to the present exemplary embodiment, a rule of the port filtering is exemplified in a white list format, but the configuration is not limited to this. For example, a definition based on a black list method may be adopted.

As described above, according to the present exemplary embodiment, it is possible to perform the communication control (access control) based on the port filter 910 described above on only the data communication via the software AP activated by the MFP 101.

It should be noted that, in a case where the data communication is performed with respect to the external AP by using the data communication via the wired LAN I/F 121 or a wireless client function, the MFP 101 controls the communication in accordance with a separately set port filter. These port filters are generated, for example, by the network administrator on the basis of a security policy previously set in the MFP 101. Therefore, a port filter set for "eth0" is applied to "eth0" corresponding to the network interface where the data is transmitted and received via the wired LAN I/F 121. In a case where the data communication is performed on the external AP by using the wireless client function, a port filter set for "wlan0" is applied to "wlan0" corresponding to the network interface used by the MFP 101 for the infrastructure connection.

Descriptions will be provided with reference to FIG. 8 again. In S807, the CPU 111 determines whether or not the software AP based on the setting for the wireless LAN setting mode is operating in cooperation with the wireless LAN I/F 122. When the software AP based on the setting for the wireless LAN setting mode is operating, the processing proceeds to S702 in FIG. 7. When the software AP based on the setting for the wireless LAN setting mode is not operating, the processing proceeds to S808.

In S808, the CPU 111 determines whether or not the software AP for the other use is operating in cooperation with the wireless LAN I/F 122. When the software AP for the other use is operating, the processing proceeds to S809. When the software AP for the other use is not operating, the processing proceeds to S810.

In S809, the CPU 111 stops the operating software AP in cooperation with the wireless LAN I/F 122, and the processing proceeds to S810. In S810, the CPU 111 activates the software AP on the basis of the setting for the wireless LAN setting mode. For example, the CPU 111 activates the software AP in which the ESSID is set as "PRINTER-ConfigAP" and the network key is set as "456".

In S811, the CPU 111 applies the port filter for the wireless LAN setting mode to "wlan1" where the data is transmitted and received via the software AP. According to the present exemplary embodiment, a rule is described in the port filter for the wireless LAN setting mode used in S811 for performing communication control which is different from that of the port filter for the mobile cooperation used in S806. This configuration will be described with reference to FIG. 9B.

FIG. 9B is an explanatory diagram for describing a port filter 920 applied to "wlan1" in a case where the software AP for the mobile cooperation is activated.

Port 161 is a port used in Simple Network Management Protocol (SNMP), and Port 80 is a port used in Hyper Text Transfer Protocol (HTTP). Port 5683 is a port used in Constrained Application Protocol (CoAP). Since these ports are used for transmitting and receiving the data at the time of the cooperation with the setting application, the data transmission and reception in the above-described ports are permitted. Since Port 67 used by the DHCP service and Port 5353 for performing a search are ports used for transmitting the data at the time of the cooperation with the setting application, the transmission of data using the above-described ports is permitted.

In a case where the software AP for the wireless LAN setting service is activated, a port filter having a rule described in which only ports where the communication occurs at the time of the cooperation with the setting application of the communication terminal are released and the other ports are closed is applied to "wlan1". Therefore, in a case where the software AP for the wireless LAN setting service is activated, the MFP 101 can discard the data transmitted towards the port used for waiting for the print data in the RAW printing or the LPR printing without receiving the data.

In a case where the above-described software AP for the mobile cooperation is activated, the MFP 101 can discard the communications using Ports 161, 80, and 5683 which are used in the setting application. Therefore, the cooperation with the setting application is not performed while the MFP 101 activates the software AP for the mobile cooperation.

When the application of the port filter to "wlan1" where the data is transmitted and received via the software AP is completed, the processing proceeds to S702 in FIG. 7. In S702, the CPU 111 performs connection processing when a connection request with respect to the software AP is accepted from the communication terminal 102.

In S703, in a case where the CPU 111 establishes the wireless communication using the software AP, the processing proceeds to S704. In a case where the wireless communication using the software AP is not established, the processing proceeds to S710.

In S704, the CPU 111 determines whether or not the wireless LAN setting data is received from the communication terminal 102 via the software AP. In a case where the wireless LAN setting data is received, the processing proceeds to S705. In a case where the wireless LAN setting data is not received, the processing proceeds to S708.

It should be noted that, since the port for accepting the setting data is released in a case where the software AP for the wireless LAN setting mode is activated as described with reference to FIG. 8 and FIGS. 9A and 9B, it is possible to receive the wireless LAN setting data transmitted from the communication terminal 102. On the other hand, in a case where the software AP for the mobile cooperation mode is activated, even if the setting data is transmitted from the communication terminal 102 to the MFP 101, the above-described setting data is discarded without receiving the setting data since the port for accepting the setting data is closed.

In S705, the CPU 111 analyzes the received setting data and obtains the ESSID, the security key, and the like included in the setting data as the connection information. In addition, the CPU 111 stores the obtained connection information as the wireless network setting for the MFP 101 to be connected to the external AP.

In S706, the CPU 111 stops the operating software AP in cooperation with the wireless LAN I/F 122, and the processing proceeds to S707.

In S707, the CPU 111 controls the wireless LAN I/F 122 and reflects the wireless network setting for establishing the connection to the external AP. It should be noted that reactivation of the MFP 101 is performed if the reactivation of the MFP 101 needs to be performed to reflect the setting. When the reflection processing is completed, the series of cooperation processings are ended, and the processing returns to S601.

In S708, the CPU 111 determines whether or not the print data is received from the communication terminal 102 via the software AP. In a case where the print data is received, the processing proceeds to S709. In a case where the print data is not received, the processing proceeds to S710.

It should be noted that, in a case where the software AP for the mobile cooperation mode is activated as described with reference to FIG. 8 and FIGS. 9A and 9B, it is possible to receive the print data transmitted from the communication terminal 102 since the port for accepting the print data is released. On the other hand, in a case where the software AP for the wireless LAN setting mode is activated, the port for accepting the print data is closed. Therefore, even if the print data is transmitted from the communication terminal 102 to the MFP 101, this print data is discarded without receiving the print data since the port for accepting the print data is closed.

In S709, the CPU 111 prints an image on a sheet on the basis of the received print data. When the printing is completed, the processing proceeds to S710.

In S710, the CPU 111 determines whether or not an instruction for stopping the software AP is accepted. In a case where the instruction for stopping the software AP is accepted, the processing proceeds to S711. In a case where the instruction for stopping the software AP is not accepted, the processing returns to S702.

In S711, the CPU 111 stops the activated software AP. When the processing in S711 is completed, the series of cooperation processings are ended, and the processing returns to S601.

As described above, according to the present exemplary embodiment, the communication control based on the different port filter is performed in accordance with the operation mode when the direct wireless communication is performed. Therefore, in a case where the cooperation between the communication terminal 102 and the MFP 101 is performed by the direct wireless communication, it is possible to perform the appropriate communication control in accordance with the operation mode.

MODIFIED EXAMPLE 1

According to the first exemplary embodiment, the configuration has been described where the port filter applied to the network interface where the data is transmitted and received via the software AP is varied while it is presumed that the wireless LAN I/F 122 does not activate a plurality of software APs at the same time.

Incidentally, a wireless LAN module that can activate a plurality of software APs at the same time has been developed along progresses in device and chip development technologies.

According to Modified Example 1, control will be described while it is presumed that the wireless LAN I/F 122 can activate the plurality of software APs at the same time. It should be noted that, according to Modified Example 1, a difference in hardware configurations of the presumed apparatuses is only the wireless LAN I/F 122, and the other configurations are similar to the first exemplary embodiment. The wireless LAN I/F 122 included in the MFP 101 according to Modified Example 1 activates a plurality of software APs at the same time and can independently operate the plurality of software APs.

Therefore, a logical network interface where the data is transmitted and received via the software AP is provided for each software AP according to Modified Example 1. For example, in a case where the wireless LAN I/F 122 operates the software AP for the wireless LAN setting and the software AP for the mobile cooperation according to Modified Example 1 and logically includes four network interface. Herein, the wired LAN network interface is referred to as "eth0", and the network interface in the infrastructure mode is referred to as "wlan0" similarly as in the first exemplary embodiment. The network interface where the data is transmitted and received via the software AP activated for the wireless LAN setting is referred to as "wlan1". The network interface where the data is transmitted and received via the software AP activated for the mobile cooperation is referred to as "wlan2".

Figure 10:
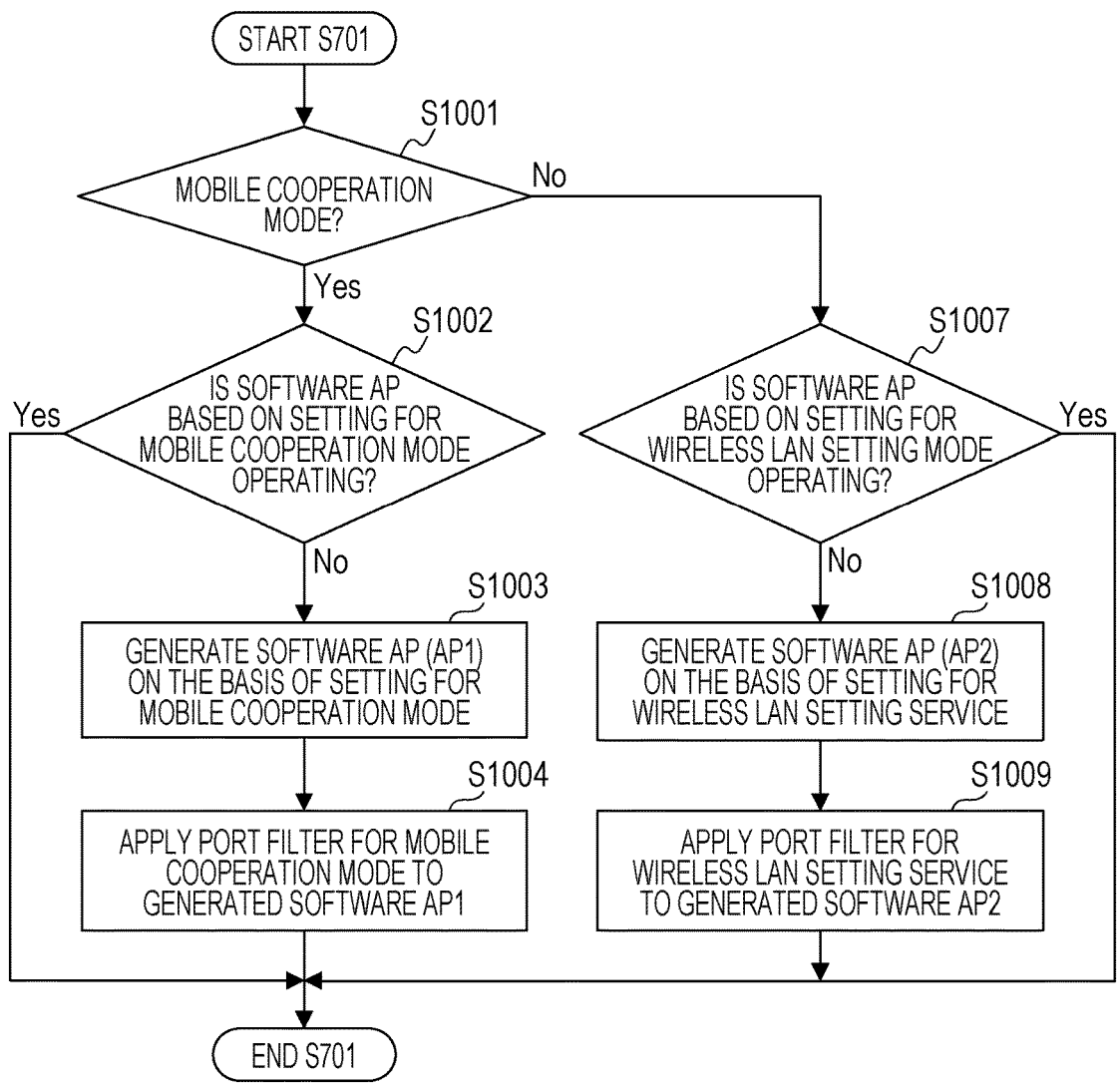
FIG. 10 is an example of a flow chart illustrating a modified example of the control related to the AP of the MFP.

FIG. 10 is a flow chart for describing the activation processing for the software AP according to the modified example. The flow chart of FIG. 10 is executed instead of the flow chart of FIG. 8 according to the first exemplary embodiment. Respective operations (steps) illustrated in the flow chart of FIG. 10 are realized when the CPU 111 reads out the programs for realizing the respective control modules which are stored in the ROM 112 or the storage 114 onto the RAM 113 to be executed.

In S1001, the CPU 111 determines whether or not the operation is performed in the mobile cooperation mode. In a case where the operation is performed in the mobile cooperation mode, the processing proceeds to S1002. In a case where the operation is not performed in the mobile cooperation mode, the processing proceeds to S1007. This processing is similar to the processing in S801 according to the first exemplary embodiment.

In S1002, the CPU 111 determines whether or not the software AP based on the setting for the mobile cooperation mode is operating in cooperation with the wireless LAN I/F 122. When the software AP is operating, the activation processing for the software AP is ended. When the software AP is not operating, the processing proceeds to S1003.

In S1003, the CPU 111 generates the software AP based on the setting for the mobile cooperation in cooperation with the wireless LAN I/F 122. For example, the CPU 111 generates the software AP in which the ESSID is set as "PRINTER-AP" and the network key is set as "123". For convenience of the descriptions, the software AP generated in S1003 will be referred to as a software AP1. When the generation of the software AP1 is completed, the processing proceeds to S1004.

In S1004, the CPU 111 applies the port filter for the mobile cooperation to "wlan1" corresponding to the network interface where the data is transmitted and received via the software AP1 generated in S1003. When the application is completed, the activation processing for the software AP is ended. As a result of this processing, the MFP 101 can permit the communication used at the time of the cooperation with the printing application of the communication terminal 102 and restrict the other communication in the wireless direct communication via the software AP1 activated for the mobile cooperation mode.

On the other hand, in S1007, the CPU 111 determines whether or not the software AP based on the setting for the wireless LAN setting mode is operating in cooperation with the wireless LAN I/F 122. When the software AP is operating, the activation processing for the software AP is ended. When the software AP is not operating, the processing proceeds to S1008.

In S1008, the CPU 111 generates the software AP based on the setting for the wireless LAN setting mode in cooperation with the wireless LAN I/F 122. For example, the CPU 111 generates the software AP in which the ESSID is set as "PRINTER-ConfigAP" and the network key is set as "456". For convenience of the descriptions, the software AP generated in S1008 will be referred to as a software AP2. When the generation of the software AP2 is completed, the processing proceeds to S1009.

In S1009, the CPU 111 applies the port filter for the wireless LAN setting mode to "wlan2" corresponding to the network interface where the data is transmitted and received via the software AP2 generated in S1008. When the application is completed, the activation processing for the software AP is ended. As a result of this processing, the MFP 101 can permit the communication used at the time of the cooperation with the setting application of the communication terminal 102 and restrict the other communication in the wireless direct communication via the software AP2 activated for the wireless LAN setting mode.

As described above, according to Modified Example 1, even in a case where the MFP 101 includes the wireless LAN I/F 122 that can activate the plurality of software APs, it is possible to apply the different port filter to each of the network interfaces where the communication is performed by using the software AP. Therefore, it is possible to vary the access control at the time of the direct wireless communication for each of software APs to be generated.

Other Exemplary Embodiments

Furthermore, a configuration may be adopted where the network administrator can change the port filter for the mobile cooperation applied to the activated software AP or the port filter for the wireless LAN setting.

FIGS. 11A and 11B illustrate an example of the screen displayed on the operation unit 116 of the MFP 101, illustrating a setting change screen of the port filter. First, FIG. 11A will be described.

FIG. 11A illustrates an example of a screen for the user who has the authority of the network management of the MFP 101 to change the setting of the port filter. The user can change the setting of the port filtering by pressing an edit key. The user can also add a new rule of the port filtering by pressing an add key. It should be noted that the port numbers can also be set by specifying a range like "10-200". Although FIG. 11A illustrates the example of the setting change of the port filter for the mobile cooperation, a similar method can be adopted to perform the setting change of the port filter for the wireless LAN setting mode.

The CPU 111 of the MFP 101 updates the port filter stored in the storage 114 on the basis of the setting performed via the screen of FIG. 11A. When the update is completed, it is possible to perform the access control of the wireless communication via the software AP on the basis of the completed port filter. Therefore, it is possible to perform the setting change of the port filter also in a case where the new function is added to the application of the MFP 101 or the communication terminal.

FIG. 11B illustrates a modified example of the screen for the user who has the authority of the network management of the MFP 101 to change the setting of the port filter. In FIG. 11B, the user who has the authority of the network management can more easily perform the setting with regard to the permission or prohibition of the communication. The user can set each of the respective functions to be used in cooperation with the communication terminal 102 as ON or OFF via the screen of FIG. 11B.

The MFP 101 previously stores a port number list for each function in the storage 114 which is used when the function is used. The CPU 111 updates the port filter stored in the storage 114 on the basis of the setting change with regard to the ON or OFF state which is performed via the screen of FIG. 11B and the port number list for each of the respective functions stored in the storage 114. It should be noted that FIG. 11B illustrates the example of the setting change in the port filter for the mobile cooperation, but a similar method can also be used to perform the setting change in the port filter for the wireless LAN setting mode.

In addition, according to the above-described exemplary embodiment, the MFP 101 and the communication terminal 102 execute the direct wireless communication via the software AP of the MFP 101 as described above, but the execution method of the direct wireless communication is not limited to this. For example, the direct wireless communication may be executed on the basis of Wi-Fi Direct (registered trademark) specified by Wi-Fi Alliance.

As described above, according to an aspect of the present invention, even in a case where the direct wireless communication is used for the plurality of uses, it is possible to appropriately control the cooperation between the communication terminal and the information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-232716 filed Nov. 30, 2016, which is hereby incorporated by reference herein in its entirety.

What is claimed is:

1. An information processing apparatus that performs a direct wireless communication with a communication terminal, the information processing apparatus comprising:
   a wireless local area network (LAN) interface;
   a memory device that stores set of instructions; and
   at least one processor that executes the instructions of
   controlling the wireless LAN interface to activate an access point to be used in the direct wireless communication, and
   controlling, upon condition that the information processing apparatus operates in a first mode where an instruction for a predetermined setting change of the information processing apparatus is waited for from the communication terminal by using the direct wireless communication, transmission and reception of data via the access point by using a first communication filter, and controlling, upon condition that the information processing apparatus operates in a second mode which is different from the first mode, the transmission and the reception of the data via the access point by using a second communication filter.

2. The information processing apparatus according to claim 1, wherein the first mode is an operation mode adopted upon condition that a network setting of the information processing apparatus is changed by using the communication terminal, and the second mode is an operation mode adopted upon condition that print data is received from the communication terminal and printed.

3. The information processing apparatus according to claim 1, wherein the wireless LAN interface is controlled to activate the access point upon condition that a user instruction for operating the information processing apparatus in the first mode is accepted or upon condition that a user instruction for operating the information processing apparatus in the second mode is accepted.

4. The information processing apparatus according to claim 3, wherein, upon condition that a user instruction for using the second mode is accepted in a state in which the access point is activated in a setting for the first mode, the access point in a setting for the second mode is activated instead of the access point activated in the setting for the first mode.

5. The information processing apparatus according to claim 4, wherein, upon condition that a user instruction for using the first mode is accepted in a state in which the access point is activated in the setting for the second mode, the access point in the setting for the first mode is activated instead of the access point activated in the setting for the second mode.

6. The information processing apparatus according to claim 5, wherein the setting for the first mode and the setting for the second mode include at least a service set identifier (SSID) for identifying the access point and a network key.

7. The information processing apparatus according to claim 1, wherein the first communication filter is structured in a manner that reception of at least print data is not permitted, and the second communication filter is structured in a manner that the reception of at least the print data is permitted.

8. The information processing apparatus according to claim 1, wherein the first communication filter and the second communication filter are port filters.

9. The information processing apparatus according to claim 1,
   wherein the wireless LAN interface can further operate in an infrastructure mode for establishing a connection to a network provided by an access point outside the information processing apparatus, and
   wherein, upon condition that the wireless communication is performed with an outside in the infrastructure mode, the transmission and the reception of the data with the outside are controlled on a basis of a third communication filter.

10. The information processing apparatus according to claim 1, further comprising a wired LAN interface,
    wherein, upon condition that a communication is performed with an outside via the wired LAN interface, the transmission and the reception of the data with the outside are controlled on a basis of a third communication filter.

11. The information processing apparatus according to claim 1, wherein the information processing apparatus is a printer.

12. A control method for an information processing apparatus that includes a wireless local area network (LAN) interface and performs a direct wireless communication with a communication terminal via the wireless LAN interface, the control method comprising:
    controlling the wireless LAN interface to activate an access point to be used in the direct wireless communication; and
    controlling, upon condition that the information processing apparatus operates in a first mode where an instruction for a predetermined setting change of the information processing apparatus is waited for from the communication terminal by using the direct wireless communication, transmission and reception of data via the access point by using a first communication filter, and controlling, upon condition that the information processing apparatus operates in a second mode which is different from the first mode, the transmission and the reception of the data via the access point by using a second communication filter.

13. A non-transitory computer-readable storage medium storing a program for causing a computer to execute a method for controlling an information processing apparatus that includes a wireless local area network (LAN) interface and performs a direct wireless communication with a communication terminal via the wireless LAN interface, the method comprising:

controlling the wireless LAN interface to activate an access point to be used in the direct wireless communication; and controlling, upon condition that the information processing apparatus operates in a first mode where an instruction for a predetermined setting change of the information processing apparatus is waited for from the communication terminal by using the direct wireless communication, transmission and reception of data via the access point by using a first communication filter, and controlling, upon condition that the information processing apparatus operates in a second mode which is different from the first mode, the transmission and the reception of the data via the access point by using a second communication filter.

* * * * *